US012532152B2

United States Patent
Carney Landow

(10) Patent No.: US 12,532,152 B2
(45) Date of Patent: Jan. 20, 2026

(54) BLOCKCHAIN CALL ORIGINATION FOR EMERGENCY SERVICES

(71) Applicant: DISH Wireless L.L.C., Littleton, CO (US)

(72) Inventor: Kate Megan Carney Landow, Denver, CO (US)

(73) Assignee: DISH Wireless L.L.C., Littleton, CO (US)

( * ) Notice: Subject to any disclaimer, the term of this patent is extended or adjusted under 35 U.S.C. 154(b) by 293 days.

(21) Appl. No.: 18/189,432

(22) Filed: Mar. 24, 2023

(65) Prior Publication Data

US 2023/0319535 A1   Oct. 5, 2023

Related U.S. Application Data

(60) Provisional application No. 63/325,258, filed on Mar. 30, 2022.

(51) Int. Cl.
*H04W 4/00* (2018.01)
*H04W 4/02* (2018.01)
*H04W 4/90* (2018.01)

(52) U.S. Cl.
CPC ............... *H04W 4/90* (2018.02); *H04W 4/02* (2013.01)

(58) Field of Classification Search
CPC .................................. H04W 4/90; H04W 4/02
See application file for complete search history.

(56) References Cited

U.S. PATENT DOCUMENTS

2019/0387000 A1* 12/2019 Zavesky ................. H04L 67/51
2023/0118664 A1*  4/2023 Andriopoulou ......... H04L 67/63
                                                              709/223

* cited by examiner

*Primary Examiner* — Omoniyi Obayanju
(74) *Attorney, Agent, or Firm* — Kilpatrick Townsend & Stockton LLP

(57) ABSTRACT

Various arrangements for performing blockchain-based emergency call origination are presented herein. An emergency communication can be routed between a piece of user equipment (UE) and a public safety answering point (PSAP) via a network, such as a cellular network or ISP network. One or more nodes of the network can update a blockchain ledger used to route the emergency communication. The blockchain ledger can be accessed to determine a communication path between the piece of UE and the PSAP. The location of the piece of UE can be estimated based on the communication path.

8 Claims, 6 Drawing Sheets

BLOCKCHAIN CALL ORIGINATION FOR EMERGENCY SERVICES

CROSS REFERENCES TO RELATED APPLICATIONS

This Application claims priority to U.S. Provisional Patent Application No. 63/325,258, filed on Mar. 30, 2022, entitled "Blockchain Call Origination Identification for Emergency Services," the entire disclosure of which is hereby incorporated by reference for all purposes.

BACKGROUND

When an emergency phone call is made to a universal emergency number (e.g., a call to 911 in the United States), location is of critical importance. An injured, confused, excited, or panicked caller may not be readily able to identify his or her location at which emergency assistance is needed. Therefore, it may be useful to obtain location information directly from the user equipment (UE) being used to place the emergency call. While a global navigation satellite system (GNSS) sensor such as a global positioning system (GPS) sensor may provide precise coordinates, in some circumstances, such coordinates may not be available, such as due to GNSS signal blockage within a building.

SUMMARY

Various embodiments are described related to a blockchain-based communication origination system. In some embodiments, a blockchain-based communication origination system is described. The system may comprise a plurality of nodes. Multiple nodes of the plurality of nodes may be used to route an emergency communication between a piece of user equipment (UE) and a public safety answering point (PSAP). The plurality of nodes may be configured to collectively maintain a blockchain-based ledger. The blockchain-based ledger may be indicative of communications routed by the plurality of nodes for UE. The system may comprise a blockchain-based location monitoring system. The blockchain-based location monitoring system may be configured to access the blockchain-based ledger maintained by the plurality of nodes. The blockchain-based location monitoring system may be configured to determine, using the blockchain-based ledger, a communication path to the piece of UE. The blockchain-based location monitoring system may be configured to determine a location of the piece of UE based on the communication path.

Embodiments of such a system may include one or more of the following features: the blockchain-based ledger may be maintained only for emergency communications. The emergency communication may be an emergency phone call placed to a universal emergency number. The blockchain-based location monitoring system being configured to determine the location of the piece of UE based on the communication path may comprise the blockchain-based location monitoring system being configured to determine that a service address mapped to the piece of UE may be eligible to be accurate based on the communication path and a network map. The plurality of nodes may comprise cellular network radio access network (RAN) components of a cellular network. At least one node of the plurality of nodes may be implemented on a public cloud computing platform. The cellular network may be a 5G New Radio (NR) cellular network and the cellular network RAN components may comprise at least: a plurality of distributed units and a plurality of centralized units. The plurality of nodes may comprise internet service provider (ISP) infrastructure. The service address mapped to the piece of UE may be provided by a customer as an address at which a Wi-Fi access point may be installed. The blockchain-based location monitoring system may be further configured to output an indication that the service address may be eligible to be from where the emergency phone communication originated. The system may further comprise a public safety answering point (PSAP) system. The PSAP system may be configured to receive the indication that the service address may be eligible to be from where the emergency communication originated. The PSAP system may be configured to output a visual indication of the indication while the emergency phone communication may be ongoing. The plurality of nodes may further comprise cellular network RAN components of a cellular network.

In some embodiments, a method for performing blockchain-based emergency call origination is described. The method may comprise routing an emergency communication between a piece of user equipment (UE) and a public safety answering point (PSAP) via a network. The method may comprise identifying that the emergency communication is to be given priority by the network. The method may comprise updating, by the network, a blockchain ledger by one or more nodes of the network used to route the emergency communication. The method may comprise accessing the blockchain ledger to a communication path between the piece of UE and the PSAP. The method may comprise determining a location of the piece of UE based on the communication path.

Embodiments of such a method may include one or more of the following features: the network may be an internet service provider (ISP) network. The network may be a cellular network. The cellular network may be a 5G New Radio (NR) cellular network and the nodes may comprise one or more components of a radio access network (RAN) of the 5G NR cellular network. The emergency communication may be an emergency phone call placed to a universal emergency number. The method may further comprise determining that a service address associated with the piece of UE may be eligible to be accurate based on the communication path and a network map of the network. The method may further comprise outputting a visual indication of the indication while the emergency phone communication may be ongoing.

In some embodiments, a non-transitory processor-readable medium is described. The medium may comprise processor-readable instructions configured to cause one or more processors to route an emergency communication between a piece of user equipment (UE) and a public safety answering point (PSAP) via a network. The medium may comprise processor-readable instructions configured to cause one or more processors to identify that the emergency communication is to be given priority by the network. The medium may comprise processor-readable instructions configured to cause one or more processors to update a blockchain ledger by nodes of the network used to route the emergency communication.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

For regulatory reasons, safety reasons, or both, having multiple ways of determining the location of a UE from which a telephone call or other communication (e.g., SMS text message, IP-based audio or video call) originated may be beneficial. Global navigation satellite system (GNSS) sensors, such as GPS sensors and equivalents, may provide an accurate location, but require that the UE have a GNSS sensor onboard and have the ability to receive signals from multiple satellites in orbit. In some circumstances, such as for wireless network hotspots (e.g., a public Wi-Fi access point (AP), a private Wi-Fi access point) paired with an internet service provider's (ISP's) network, a service address may be mapped to an ISP account. While this service address is likely accurate, there are instances where it could be incorrect, such as if a business or person moved to another address and reinstalled the access point from the original address and failed to update their service address.

Embodiments detailed herein allow for a UE's location to be determined based on a blockchain-based ledger that indicates routing of communications through a cellular network, an ISP's network, or a combination of both. Components within the cellular network and/or ISP network, in addition to performing communication and routing functions, can collectively maintain a blockchain-based ledger. Specific communications (e.g., only emergency communications placed to a specific universal emergency number, such as 911 in the United States or 000 in Australia) that are sent through a node may be recorded in the node's ledger. Such communications may already be tagged as high priority, so identifying which communications correspond to emergency communications may be straightforward. When a location needs to be determined for the originating UE, the ledgers of nodes can be analyzed to determine the route through which the emergency communication was routed. Based on the route through which data corresponding to the emergency communication was transmitted (or is actively being transmitted), a determination can be made as to: 1) the general location of the UE; or 2) whether the emergency communication likely corresponds to a previously established service address (e.g., address at which an AP is installed). Regarding point one, a general location may be determined based on the route through which the data for the communication was transmitted. For example, in a cellular network-based implementation, the location may be as specific as a particular antenna beam of a base station (BS) of a cellular network.

Figure 1A:
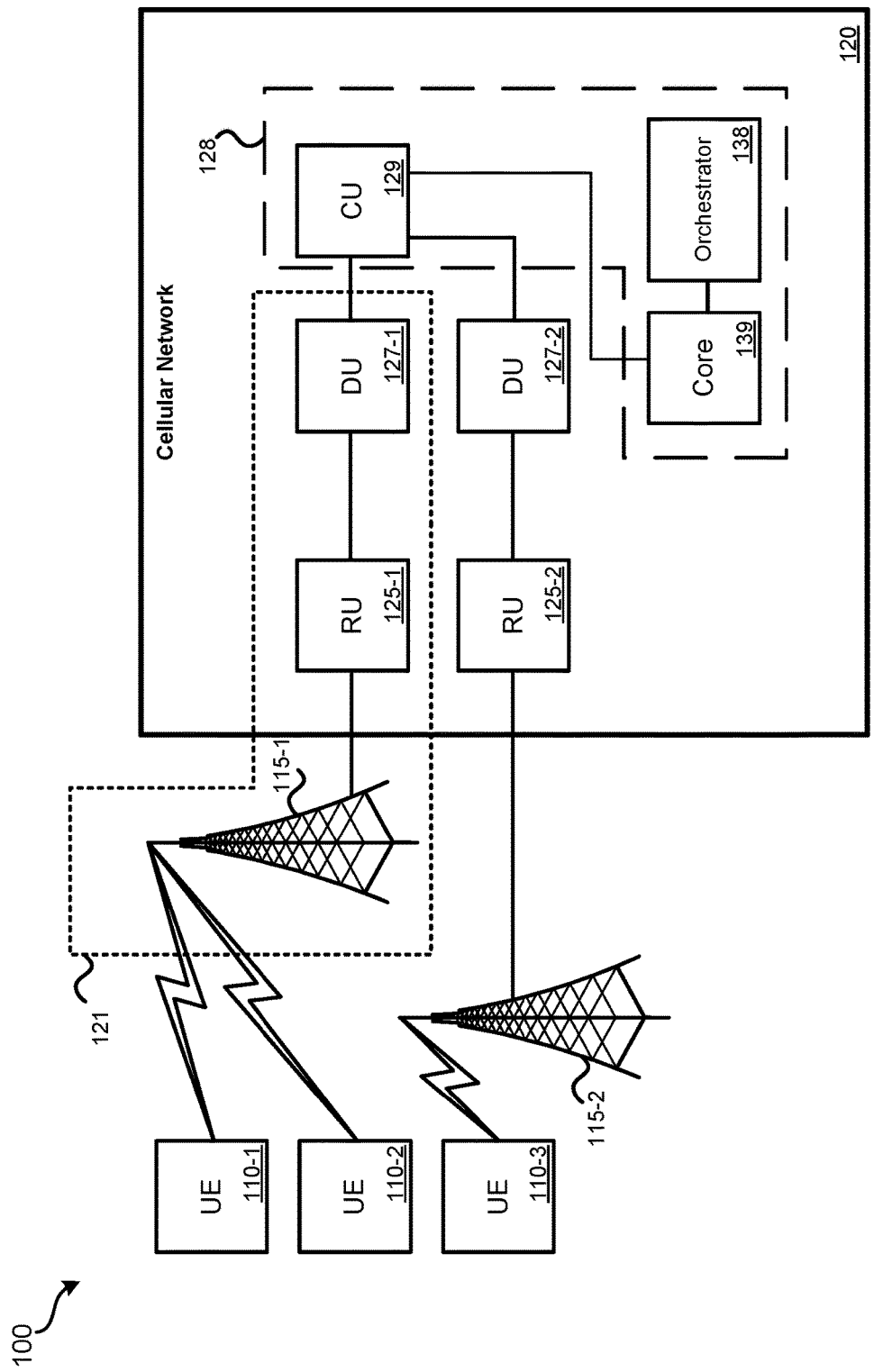
FIG. 1A illustrates an embodiment of a 5G cellular network.

Details of these embodiments and other embodiments are provided in relation to the figures. FIG. 1A illustrates an embodiment of a cellular network system 100 ("system 100"). System 100 can include a 5G New Radio (NR) cellular network; other types of cellular networks, such as 4G LTE, 6G, 7G, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); core 139, and orchestrator 138. FIG. 1A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 2.

UE 110 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots, unmanned aerial (or land-based) vehicles, network-connected vehicles, environmental sensors, etc. UE 110 may use RF to communicate with various base stations of cellular network 120. As illustrated, two base stations 115 (BS 115-1, 115-2) are illustrated. Real-world implementations of system 100 can include many (e.g., hundreds, thousands) of base stations, and many RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT, such as 4G Long Term Evolution (LTE). The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or core 139. Other DUs may or may not have this capability.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

In the context of blockchain-based call origination, at least some of the components of the cellular network, such as DUs 127 and CU 129, can participate in maintaining the blockchain-based ledger for emergency communications. Similarly, some or all components of core 139, such as exemplified in FIG. 1B, can participate in maintaining the ledger. Further, such components of the cellular network can actively participate in recording ledger entries indicative of when emergency communications were routed by the respective component.

Figure 1B:
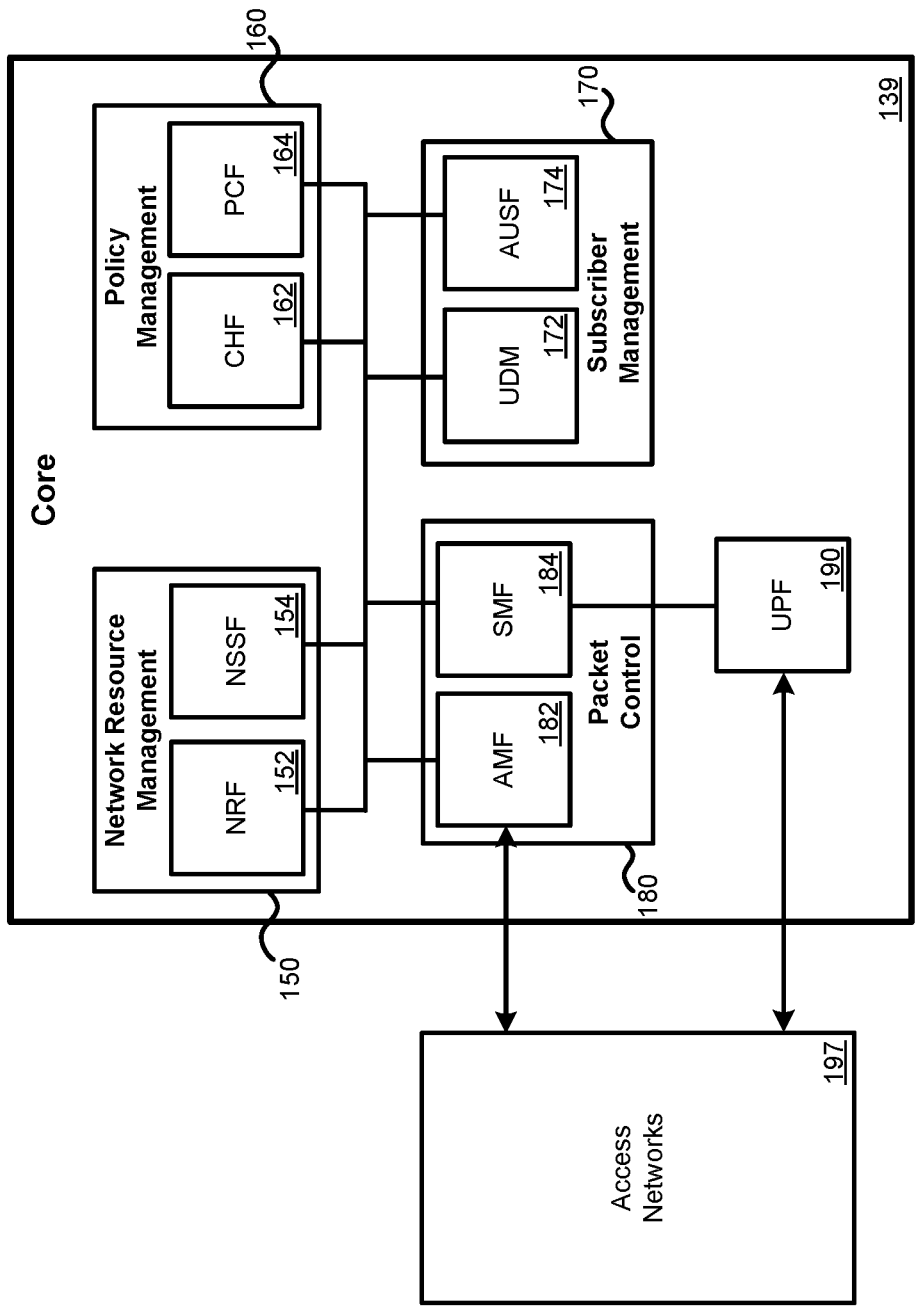
FIG. 1B illustrates an embodiment of a core of a 5G cellular network.

Further detail regarding exemplary core 139 is provided in relation to FIG. 1B. Core 139, which can be physically distributed across data centers or located at a central national data center (NDC) as detailed in relation to FIG. 2, can perform various core functions of the cellular network. Core 139 can include: network resource management components 150; policy management components 160; subscriber management components 170; and packet control components 180. Individual components may communicate on a bus, thus allowing various components of core 139 to communicate with each other directly. Core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

Each of these components of core 139 (and other, not illustrated components) can participate in recording emergency communications to a blockchain-based ledger and coordinate validation of the distributed ledger.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and core 139. Functionality of such components can be co-located or located at disparate physical server systems. For example, certain components of core 139 may be co-located with components of CU 129.

In a possible O-RAN implementation, DUs 127, CU 129, core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a public third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite; so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1; a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 1A, UE 110 may be operating on one or more production slices of cellular network 120. As detailed later in this document, UE that function on a particular entity's local network may be assigned to a slice particular to the entity or a slice that provides a particular QoE for tasks to be performed by the entity's UE.

Components such as DUs 127, CU 129, orchestrator 138, and core 139 may include various software components that are required to communicate with each other, and handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
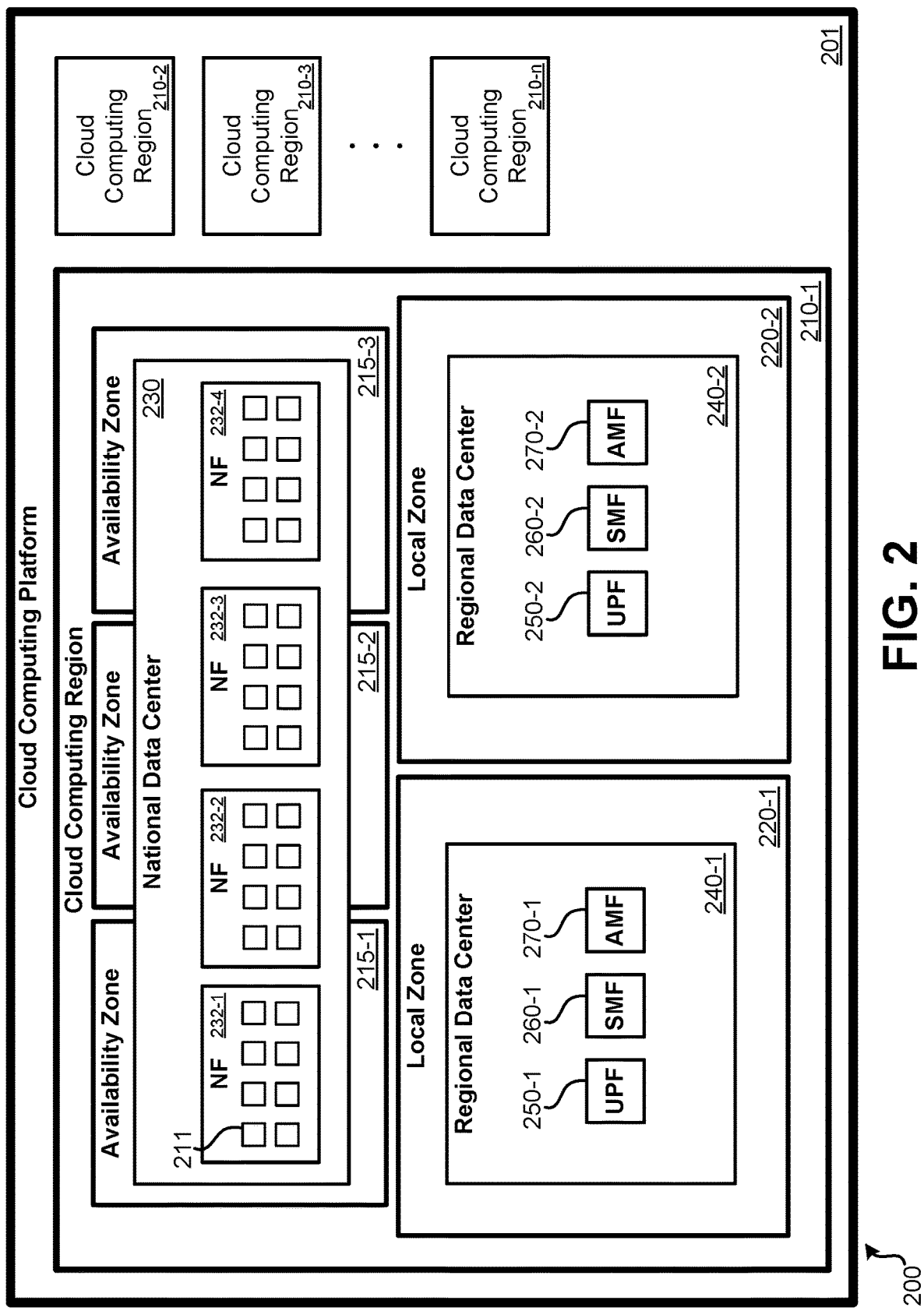
FIG. 2 illustrates an embodiment of a cellular network core implemented using a cloud computing platform.

FIG. 2 illustrates an embodiment of a cellular network core network topology 200 as implemented on a public cloud-computing platform. Such components being implemented on a cloud-computing platform can make maintenance and validation of the distributed blockchain ledger easier to implement due to a large amount of processing resources being available on the platform. (For example, to expand processing and storage capabilities, the cellular network provider can requisition more resources in association with the cellular network provider's account with the pub cloud-computing platform.)

Cellular network core network topology 200 can represent how logical cellular network groups are distributed across the cloud computing infrastructure of cloud computing platform 201. Cloud computing platform 201 can be logically and physically divided up into various different cloud computing regions 210. Each of cloud computing regions 210 can be isolated from other cloud computing regions to help provide fault tolerance, fail-over, load-balancing, and/or stability and each of cloud computing regions 210 can be composed of multiple availability zones, each of which can be a separate data center located in general proximity to each other (e.g., within 100 miles). Further, each of cloud computing regions 210 may provide superior service to a particular geographic region based on physical proximity. For example, cloud computing region 210-1 may have its datacenters and hardware located in the northeast of the United States while cloud computing region 210-2 may have its datacenters and hardware located in California. For simplicity, the details of the cellular network as executed in only cloud computing region 210-1 is illustrated. Similar components may be executed in other cloud computing regions of cloud computing regions 210 (210-2, 210-3, 210-n).

In other embodiments, cloud computing platform 201 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 210 may include multiple availability zones 215. Each of availability zones 215 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 215. For example, a database that is maintained as part of NDC 230 may be replicated across availability zones 215; therefore, if an availability zone of the cloud computing region is unavailable, a copy of the database remains up-to-date and available, thus allowing for continuous or near continuous functionality.

On a (public) cloud computing platform, cloud computing region 210-1 may include the ability to use a different type of data center or group of data centers, which can be referred to as local zones 220. For instance, a client, such as a provider of the hybrid cloud cellular network, can select from more options of the computing resources that can be reserved at an availability zone compared to a local zone. However, a local zone may provide computing resources nearby geographic locations where an availability zone is not available. Therefore, to provide low latency, certain network components, such as regional data centers, can be implemented at local zones 220 rather than availability zones 215. In some circumstances, a geographic region can have both a local zone and an availability zone.

In the topology of a 5G NR cellular network, 5G core functions of core 139 can logically reside as part of a national data center (NDC). NDC 230 can be understood as having its functionality existing in cloud computing region 210-1 across multiple availability zones 215. At NDC 230, various network functions, such as NFs 232, are executed. For illustrative purposes, each NF, whether at NDC 230 or elsewhere located, can be comprised of multiple sub-components, referred to as pods (e.g., pod 211) that are each executed as a separate process by the cloud computing environment. The illustrated number of pods is merely an example; fewer or greater numbers of pods may be part of the respective 5G core functions. It should be understood that in a real-world implementation, a cellular network core, whether for 5G or some other standard, can include many more network functions. By distributing NFs 232 across availability zones, load-balancing, redundancy, and fail-over can be achieved. In local zones 220, multiple regional data centers 240 can be logically present. Each of regional data centers 240 may execute 5G core functions for a different geographic region or group of RAN components. As an example, 5G core components that can be executed within an RDC, such as RDC 240-1, may be: UPFs 250, SMFs 260, and AMFs 270. While instances of UPFs 250 and SMFs 260 may be executed in local zones 220, SMFs 260 may be executed across multiple local zones 220 for redundancy, processing load-balancing, and fail-over.

Figure 3:
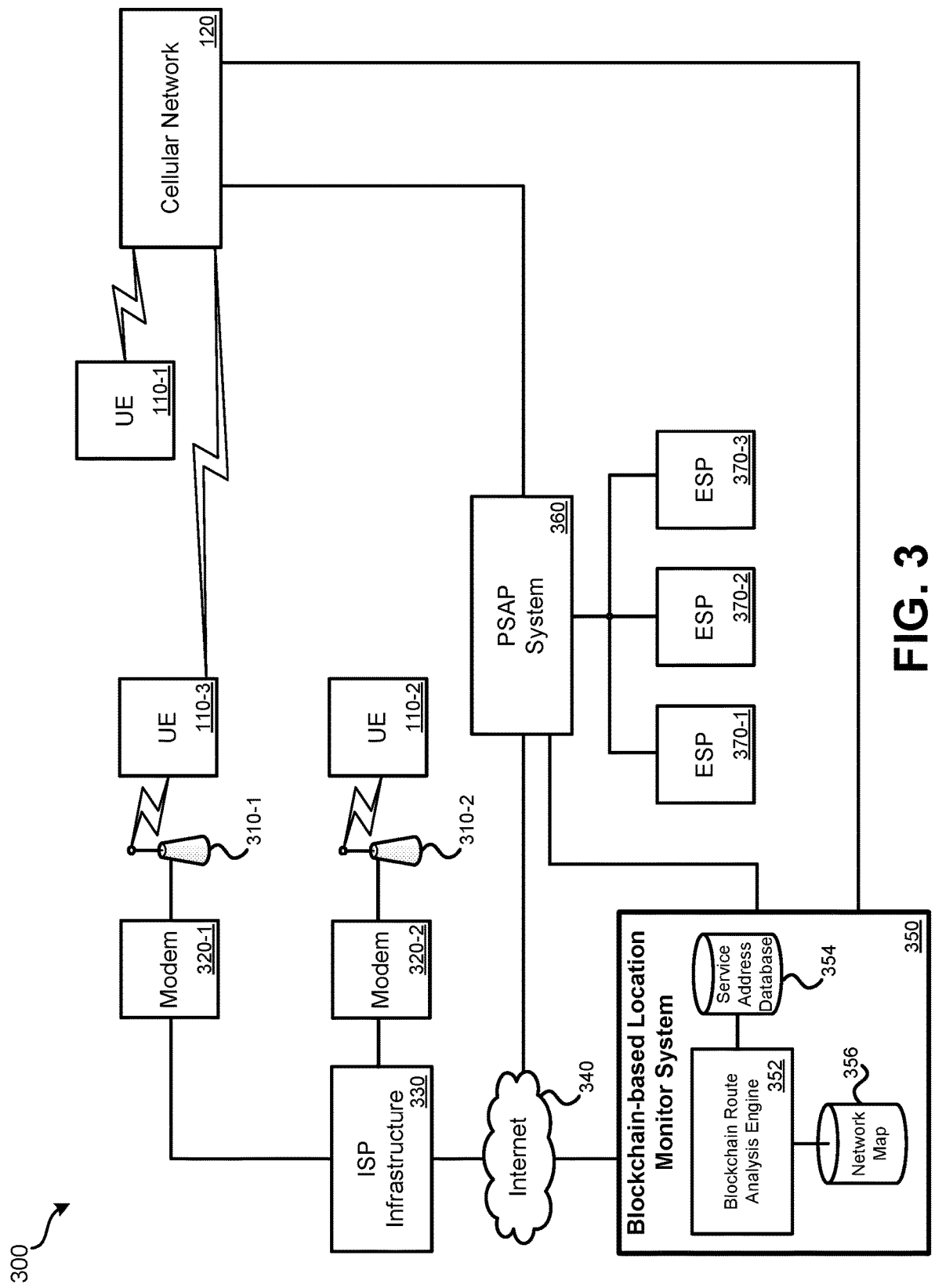
FIG. 3 illustrates an embodiment of a blockchain-based call origination system.

FIG. 3 illustrates an embodiment of a blockchain-based call origination system 300 ("system 300"). System 300 can include: UE 110; cellular network 120; modems 320; ISP infrastructure 330; Internet 340; blockchain-based location monitor system 350; public safety answering point system 360 ("PSAP 360") and emergency service providers 370 ("ESPs 370"). In this embodiment of system 300, each of UE 110 are used to place an emergency phone call or other form of emergency communication (e.g., emergency text message), such as by dialing 911 in the United States or sending a text message to 911. The specific emergency number used can vary by country or location. When an emergency communication is placed, UE 110-1, for example, may communicate via cellular network 130 with PSAP system 360; UE 110-2 may communicate with PSAP system 360 via access point 310-3, ISP infrastructure 330, and Internet 340; and UE 110-3 may communicate with PSAP system 360 via ISP infrastructure 330, Internet 340, cellular network 130, or a combination thereof.

Components within cellular network 120, such as RAN components including RUs, DUs, CUs, as detailed in relation to FIGS. 1A and 1B, may each function as nodes that contribute to and verify a distributed blockchain ledger. The ledger may also be maintained by components residing in the cloud, such as detailed in relation to FIG. 2. In some embodiments, the ledger is only maintained for emergency communications or emergency phone calls. Therefore, a non-emergency call placed from a UE does not result in the ledger being modified. In other embodiments, the ledger is updated for all communications. In still other embodiments, the ledger is updated for communications originating from or addressed to a UE for which communication (e.g., call) tracking is activated (e.g., at the request of a law enforcement agency).

When an emergency communication such as an emergency phone call is placed by UE 110-1, at least some components of cellular network 130, which is participating in routing or processing the emergency communication, may create a block or ledger entry for the distributed ledger that represents the emergency communication occurring between UE 110-1 and PSAP system 360. This entry may include details of the communication such as a start time, end time (if the communication has ended), identifier of the UE, and identifier of the component (e.g., IP address, MAC address). Depending on the type of component or node, the information stored to the entry may vary. For example, an RU or DU of cellular network 120 may indicate a particular antenna beam used to communicate with the UE from which the emergency call originated.

This ledger entry may be sent to some or all other nodes of cellular network 130 that are participating in maintaining the distributed blockchain ledger. Collectively, the entry may be validated by these other nodes. These other nodes may inspect information present within the block, such as the identity of the node that created the block, the time of transmission, the route over which the block was sent, etc. If a majority of the nodes agree that the block or entry is valid, then the block will be added to the blockchain ledger maintained across the nodes. The block can indicate information such as: an identifier of the node through which the emergency call was routed; a start and end (if available) time of the routing; and an identifier of the UE that participated in the call. Therefore, for an emergency phone call, multiple blocks within the blockchain ledger can indicate separate nodes within cellular network 130 through which the call was routed.

Blockchain-based location monitor system 350 ("BLMS 350") can access the blockchain ledger (e.g., access a locally stored copy, and access the copy of the ledger as maintained by another node) to determine a general location of the UE based on the multiple nodes through which the emergency phone call was routed. As illustrated, BLMS 350 is illustrated as separate and distinct from cellular network 120, ISP infrastructure 330, and PSAP system 360. In other embodiments, BLMS 350 can be integrated as part of any of these systems. As an example, BLMS 350 can be implemented on a public cloud computing system in communication with core 139 of cellular network 120 of FIG. 1B.

Based on performing the lookup in the blockchain ledger for the nodes through which the emergency phone call was routed, BLMS 350 can access network map 356 to determine a physical location at which the UE is generally located. Network map 356 can generally detail the physical location of nodes or components, a mapping of which nodes communicate with other nodes, and the geographic region serviced by each edge node. For example, the general location may be indicative of a geographic region in which communication with a particular antenna or radio unit of cellular network 120 is possible. The general location determined based on analyzing the blockchain ledger can be forwarded to PSAP system 360. This information forwarded to PSAP system 360 may be used as a stand-alone indication of where the UE is located or may be used in combination with other information. For example, if the general location information includes a service address (e.g., installation address) of an AP mapped to the UE, the UE may be likely to be at the service address. Alternatively, if the user gave an address or location verbally during the emergency call, the general location information may be checked for consistency with the location provided by the user of the UE verbally. Such a check may prevent a delay in emergency services arriving on scene, such as if the user accidentally said "Park Ave." instead of "Park Road."

PSAP system 360 may have access to one or more sources of information about UE 110-1's location. For example, GNSS information may be provided to PSAP system 360 that indicates coordinates. These coordinates may tend to be highly accurate at ground level, but may have difficulty in providing information about, for example, which floor within a building in the UE is located on. An indication output by blockchain-based location monitor 350 can output a general location based on the components within cellular network 130 that were used to route the communication. Such information may supplement GNSS information, such as regarding a range of floors likely. (For example, referring to UEs 110-3 and 110-2, if a particular access point is in communication with the UE, the UE may likely be within 2 floors of the AP within the same building. In a building with many stories, this may be a significant improvement in determination of location over GNSS information alone.) PSAP system 360 may use the general location information, in combination with other location information if available, to determine an appropriate ESP provider to deploy to the location of UE 110-1. For example, ESP 370-1, ESP 370-3, and ESP 370-3 may provide emergency services to different jurisdictions covering different geographic areas.

UE 110-3 represents an embodiment of UE that is only connected to a wireless network access point and not to a cellular network. In this example, UE 110-3 may be a WiFi device such as a gaming device or tablet computer. Alternatively, it may be a cellular phone that cannot connect with a cellular network, such as due to interference or a cellular network outage. Therefore, if an emergency call is placed from UE 110-2, the emergency call will be routed via access point 310-2 to PSAP system 360.

In this example, if GNSS coordinates are not available (e.g., UE 110-3 is not receiving a signal from the GNSS satellites), PSAP system 360 may be reliant on obtaining a location for UE 110-3 from another source. An address may be stored for modem 330-2 (or other form of ISP interface equipment) through which the ISP provides internet access. For example, when a user contacts with an ISP for internet service, the customer may provide an address of service at which the interface equipment has been or will be installed. BLMS 350 may store or have access to service address database 354, which maps addresses to identifiers of ISP equipment, such as mapping a MAC address of modem 330-2 to a service address. In some embodiments, service address database 354 can be stored and maintained by the ISP or some other entity. If maintained by the ISP, there may be many such databases that BLMS 350 is permitted to access if managing blockchain ledgers for multiple ISPs. It is important to note that a service address as stored by service address database 354 may be inaccurate. For example, a customer may provide a false address or may move equipment from a first address to a second address. Despite moving, the equipment can continue to function properly while connected with ISP infrastructure 330.

Therefore, based on an emergency call or other form of communication being placed via modem 330-2, a lookup can be performed to determine the service address at which modem 330-2 is likely (but not definitely) installed. Typically, if modem 330-2 is at a particular address, wireless access point 310-2, which can be wired directly to modem 330-2, is located at the same address. Access point 310-2 can create a wireless network, such as a Wi-Fi network, through which UE 110-2 can access Internet 340.

As previously mentioned, it may be possible that modem 330-2 (or some other form of equipment used to access ISP infrastructure 330) is installed at an address that does not match the stored service address present in service address database 354. Therefore, it can be beneficial to confirm whether the service address is likely accurate. A distributed blockchain ledger can be maintained by components of ISP infrastructure 330. Such a blockchain ledger can be the same or separate from the blockchain ledger maintained by cellular network 130.

Components within ISP infrastructure 330, such as routers, relays, switches, and servers, may each function as nodes that maintain a blockchain ledger. The ledger may only be maintained for emergency phone calls or other forms of emergency communications. For example, IP-based emergency calls may be tagged with a high priority to distinguish them from other IP data traffic. Therefore, a regular telephone call may not result in the ledger maintained using ISP infrastructure 330 being updated. In other embodiments, the ledger can be updated for all phone calls or communications. In still other embodiments, the ledger is updated for phone calls or communications originating from or addressed to a recipient for whom call or communication tracking is activated.

When an emergency phone call or communication is placed, some or all components of ISP infrastructure 330 that is routing or otherwise participating in the phone call or communication may each create a block or ledger entry that represents routing of the phone call or other form of communication by the node between UE 110-2 and PSAP system 360. This block may be sent to all other nodes of ISP infrastructure 330 that are participating as part of the blockchain-based call origination system. The block or ledger entry can be validated by these other nodes. These other nodes may inspect information present within the block, such as the identity of the node that created the block, the time of transmission, the route over which the block was sent, etc. If a majority of the nodes agree that the block is valid, then the block will be added to the blockchain ledger maintained across the nodes. The block can indicate: an identifier (e.g., MAC address, IP address) of the node through which the emergency call or communication was routed; the start and/or end time of the call; and an identifier of the UE that participated in the call. Therefore, for an emergency phone call, multiple blocks within the blockchain ledger indicate nodes within ISP infrastructure 330 through which the call was routed.

BLMS 350 can access the blockchain ledger maintained by the nodes of ISP infrastructure 330 to determine a general location based on the nodes through which the emergency phone call was routed. Based on performing the lookup in the blockchain ledger for the nodes through which the emergency phone call was routed, blockchain route analysis engine 353 can access network map 356 (which can indicate a mapping of the components of ISP infrastructure) to determine a physical location at which the UE is generally located. For instance, a particular router of ISP infrastructure 330 may service a particular neighborhood, which can be defined as a particular geographic area. The general location determined based on analyzing the blockchain ledger can be forwarded to PSAP system 360. In some embodiments, the service address for modem 330-2 can be accessed from service address database 354 by blockchain route analysis engine 353 and compared to the general location determined based on the blockchain ledger. An indication may be provided to PSAP system 360 to indicate whether the locations match or not. For instance, if a particular router of ISP infrastructure 330 was indicated on the blockchain as performing routing of the call and this particular router is located many miles from the service address, a comparison can be performed (e.g., by BLMS 350) and PSAP system 360 may be provided with an indication that the service address appears to be incorrect, possibly along with an indication of the location or a general location determined based on the blockchain ledger.

UE 110-3 is connected to both cellular network 130 and to ISP infrastructure 330 via modem 320-1 and access point 310-1. In this example, the location of UE 110-3 can be estimated based on blockchain entries made in the blockchain ledger of cellular network 130 and the blockchain ledger of ISP infrastructure 330. BLMS 350 can maintain a network map of both cellular network 130 and ISP infrastructure 330; therefore, BLMS 350 can determine a location based on the blockchain ledgers and possibly compare that location to a stored or otherwise accessible service address (e.g., from service address database 354).

In some embodiments, ISP infrastructure 330 may be part of cellular network 130. That is, cellular network 130 may be used to provide Internet service to locations. For example, modems 320 may be 5G or 4G modems that connect with access points 310.

In some embodiments, rather than maintaining service address database 354 separately, the service addresses themselves may be added to the distributed blockchain ledger. After a service address is established, an entry may be added to the blockchain, such as by a node of ISP infrastructure 330 that establishes an initial connection with a modem during an installation process. This initial entry may indicate the service address, a date, and a MAC address or other form of device identifier. If the modem is moved to a new address, it may be possible to create a subsequent block or ledger entry that indicates a new, superseding service address. In some embodiments, during an initial registration of the service address on the blockchain, a route is established of the nodes through which communication with the modem (or other form of ISP interface equipment) is expected to take. This route may be compared with the route later stored to the blockchain ledger for an emergency call or communication to determine if the service address is likely correct. If the network's arrangement of components is altered, BLMS 350 may have access to a datastore indicating the alterations to the network such that blockchain route analysis engine 352 can assess whether a route from prior to the alterations corresponds to a route after the alterations.

Cellular network providers are required to meet service level agreement (SLA) and/or FCC requirements (within the United States) for position accuracy as well as near perfect delivery or connectivity for emergency calls. Some implementations of blockchain ledgers may have a relatively lengthy (e.g., 10 minute) time window before blocks being added to the ledger are available on the ledger. However, as detailed herein, the described embodiments can check the blockchain ledger while still allowing SLA/FCC requirements for support of emergency services to be met. That is, connection of the emergency call or other form of emergency communication is not contingent on the content of the blockchain ledger; rather, the blockchain ledger can be checked if and when it is available as a possible way of verifying location of the UE.

Figure 4:
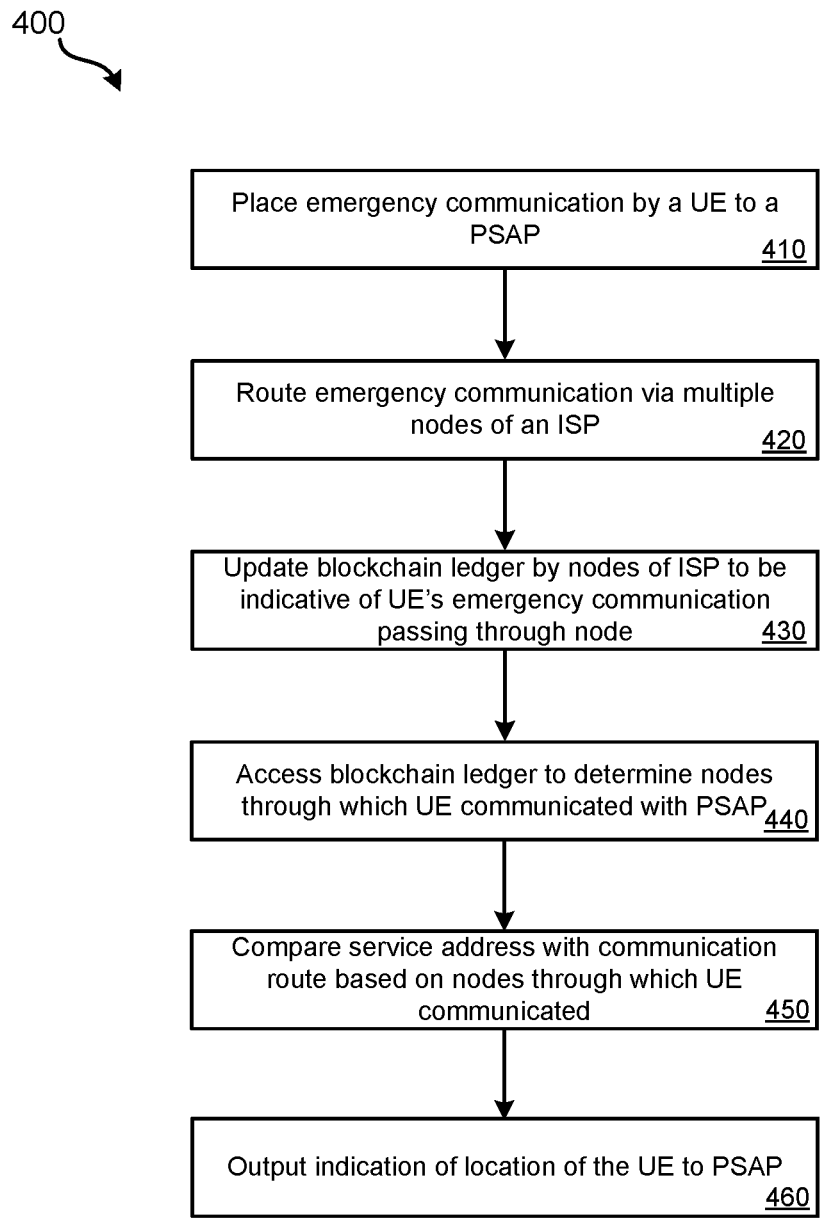
FIG. 4 illustrates an embodiment of a method for performing blockchain-based call origination using ISP infrastructure.

Various methods may be performed using the systems of FIGS. 1A, 1B, 2, and 3. FIG. 4 illustrates an embodiment of a method 400 for performing blockchain-based call origination using an ISP's network. Method 400 may be performed using topology 200 of FIG. 2, which can include ISP infrastructure 330, modems 320, and access points 310.

At block 410, an emergency communication, such as an IP-based phone call or text message, may be placed by a UE to a PSAP. The emergency phone call may be placed by dialing a dedicated number, such as 911. The UE may be connected to a wireless LAN (e.g., a Wi-Fi network) or a wired network connection that communicates via an access point and modem with a PSAP system via an ISP's infrastructure and, possibly, the Internet.

At block 420, the emergency communication may be routed to the PSAP via multiple nodes of the ISP's infrastructure. The communications routed via the ISP infrastructure may be tagged as high priority due to the emergency nature of the communication, thus making emergency communications readily identifiable by nodes of the ISP. At block 430, each node that performed routing of the emergency communication may create a block or ledger entry that identifies the UE, identifies the node through which the emergency communication was routed, and one or more times associated with the communication (e.g., start time, end time of the communication). The block may be verified by other nodes and, if a majority of other nodes agree, the block may be added to the distributed blockchain ledger maintained in common by the plurality of nodes of the ISP's infrastructure.

At block 440, the blockchain ledger can be accessed to determine the nodes which performed the routing of the emergency communication to the PSAP. Block 440 may occur while the communication is ongoing. Since the blockchain ledger is maintained in common across all nodes of the cellular network, ISP, or both, the blockchain ledger only needs to be accessed in one place. The blockchain can be accessed to determine a node of the ISP's infrastructure that communicated with the on-site equipment (e.g., modem, access point) that communicated with the UE. Using a network map, it may be possible to determine the geographic area in which the UE is located, based on the node of the ISP's infrastructure that communicated with the on-site equipment.

At block 450, if a service address for the on-site equipment of the user is stored, either on the blockchain ledger itself or in a separate database, the service address may be compared with the route or general location identified from the blockchain ledger. If the route or general location indicated in the blockchain ledger is consistent with the service address, the service address may be output to the PSAP at block 460 or an indication that the service address is consistent with the route may be output to the PSAP. In some embodiments, an indication of the general location (e.g., based on the node compared with the network map) is output at block 460. The information output to the PSAP system may be provided in a format that allows for visual output. For example, a map-based interface may be used. A colored indicator may be used (e.g., green for a strong match, yellow for a possible match, red for a mismatch between service location and general location identified based on the blockchain).

Figure 5:
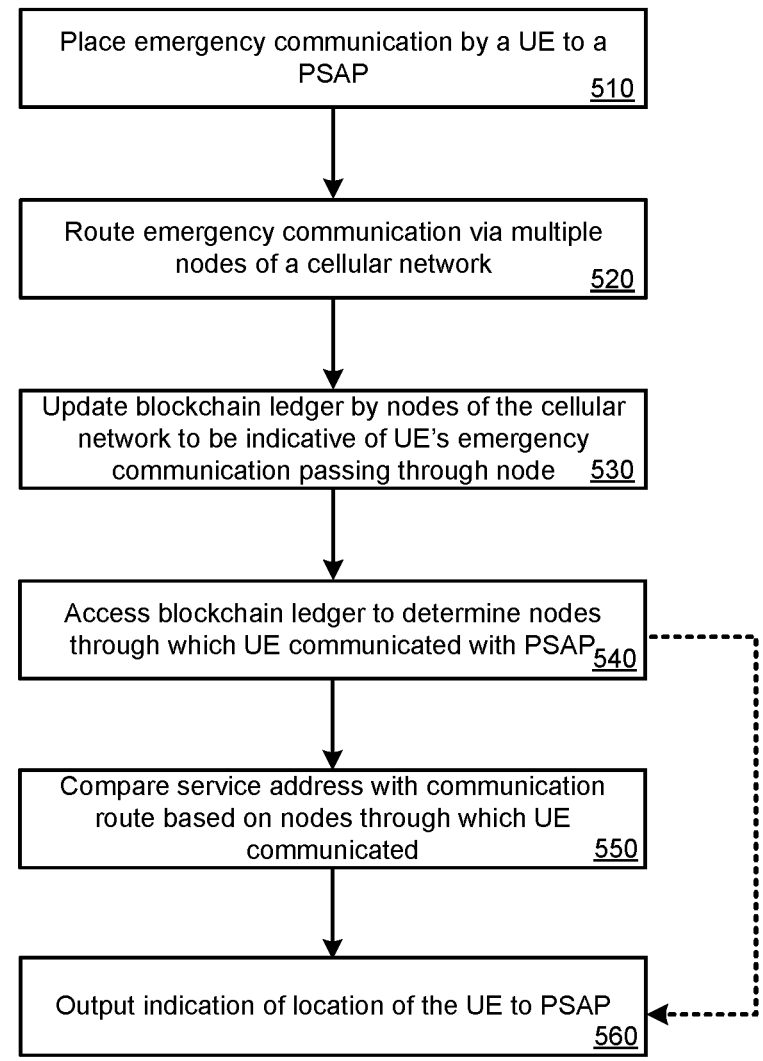
FIG. 5 illustrates an embodiment of a method for performing blockchain-based call origination using a cellular network.

FIG. 5 illustrates an embodiment of a method 500 for performing blockchain-based call origination using a cellular network. Method 500 may be performed using topology 200 of FIG. 2, which can include cellular network 120.

At block 510, an emergency communication, such as a cellular phone call or text message, may be placed by a UE to a PSAP. The emergency phone communication may be placed by dialing a dedicated number, such as 911 (in the United States). The UE is connected to the cellular network wirelessly or via an access point (e.g., a 4G or 5G modem) that communicates with the cellular network.

At block 520, the emergency communication may be routed to the PSAP via multiple nodes of the cellular network. The communications routed via the cellular network may be identified as high priority due to the communication being tagged as such (e.g., via a flag in each data packet), thus making emergency communications readily identifiable by nodes of the cellular network. At block 530, each node that performed routing of the emergency communication may create a block or ledger entry that identifies the UE, identifies the node through which the emergency communication was routed, and one or more times (e.g., start time, end time of the communication). The block may be verified by other nodes and, if a majority of other nodes agree, the block may be added to the distributed blockchain ledger maintained in common by the plurality of nodes of the cellular network.

At block 540, the blockchain ledger can be accessed to determine the nodes which performed the routing of the emergency communication to the PSAP. Block 540 may occur while the communication is ongoing. Since the blockchain ledger is maintained in common across all nodes of the cellular network, ISP, or both, the blockchain ledger only needs to be accessed in one place. The blockchain can be accessed to determine a node of the cellular network that communicated with the UE. The ledger may further indicate a particular antenna beam of a base station used to communicate with the UE. Using a network map, it may be possible to determine the geographic area in which the UE is located, based on the node of the cellular network that communicated with the on-site equipment. For example, the network map can indicate the general geographic region covered by a base station's particular antenna beam.

At block 550, if a service address for the UE of the user is stored (e.g., an address for a cellular modem), either on the blockchain ledger itself or in a separate database, the service address may be compared with the route or general location identified from the blockchain ledger. If the route or general location indicated in the blockchain ledger is consistent with the service address, the service address may be output to the PSAP at block 560 or an indication that the service address is consistent with the route may be output to the PSAP.

Alternatively, such as if the UE is a cellular phone, the UE may be fairly likely to be at a location away from the service address. Therefore, in some embodiments, an indication of the general location (e.g., based on the node compared with the network map) is output at block 560. This information may be used by the emergency service provider to ascertain whether a location provided by the user is likely correct or not. The information output to the PSAP system may be provided in a format that allows for visual output. For example, a map-based interface may be used. A colored indicator may be used (e.g., green for a strong match, yellow for a possible match, red for a mismatch between service location and general location identified based on the blockchain).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing blockchain-based emergency call origination, the method comprising:
routing an emergency communication between a piece of user equipment (UE) and a public safety answering point (PSAP) via a network;
identifying that the emergency communication is to be given priority by the network;
updating, by the network, a blockchain ledger by one or more nodes of the network used to route the emergency communication;
accessing the blockchain ledger to determine a communication path between the piece of UE and the PSAP; and determining a location of the piece of UE based on the communication path.

2. The method of claim 1, wherein the network is an internet service provider (ISP) network.

3. The method of claim 1, wherein the network is a cellular network.

4. The method of claim 3, wherein the cellular network is a 5G New Radio (NR) cellular network and the nodes comprise one or more components of a radio access network (RAN) of the 5G NR cellular network.

5. The method of claim 1, wherein the emergency communication is an emergency phone call placed to a universal emergency number.

6. The method of claim 5, further comprising:
determining that a service address associated with the piece of UE is eligible to be accurate based on the communication path and a network map of the network.

7. The method of claim 6, further comprising:
outputting a visual indication of the service address while the emergency phone call is ongoing.

8. A non-transitory processor-readable medium, comprising processor-readable instructions configured to cause one or more processors to:
route an emergency communication between a piece of user equipment (UE) and a public safety answering point (PSAP) via a network;
identify that the emergency communication is to be given priority by the network;
update a blockchain ledger by nodes of the network used to route the emergency communication;
access the blockchain ledger to determine a communication path between the piece of UE and the PSAP; and
determine a location of the piece of UE based on the communication path.

* * * * *